W. N. BOOTH.
CLAMPING DEVICE FOR DEMOUNTABLE RIMS.
APPLICATION FILED JULY 7, 1913.
1,132,648.  Patented Mar. 23, 1915.
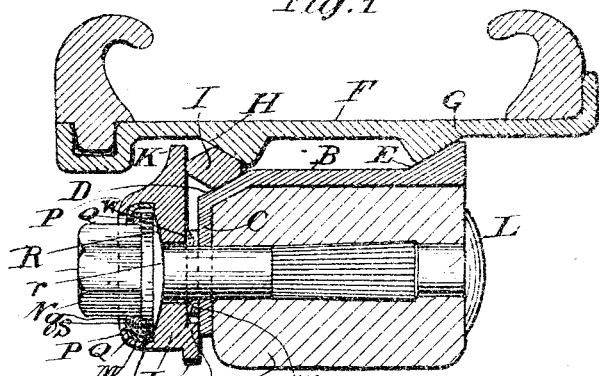
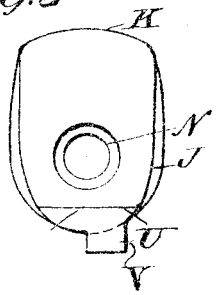
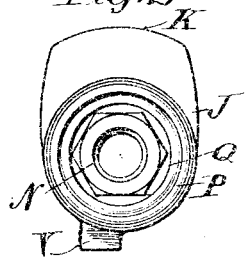
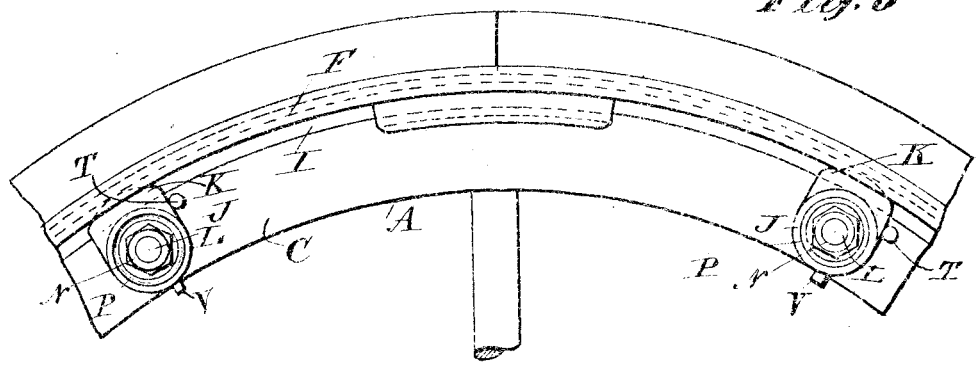
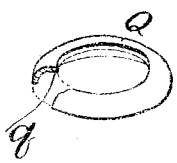
Witnesses
P. Bredel
A. Bredel
Inventor
William N. Booth
by Wm. M. Monroe
Attorney

UNITED STATES PATENT OFFICE.

WILLIAM N. BOOTH, OF DETROIT, MICHIGAN.

CLAMPING DEVICE FOR DEMOUNTABLE RIMS.

1,132,648.  Specification of Letters Patent.  Patented Mar. 23, 1915.

Application filed July 7, 1913. Serial No. 777,640.

*To all whom it may concern:*

Be it known that I, WILLIAM N. BOOTH, a citizen of the United States, and resident of Detroit, in the county of Wayne and State of Michigan, have invented certain new and useful Improvements in Clamping Devices for Demountable Rims, of which I hereby declare the following to be a full, clear, and exact description, such as will enable others skilled in the art to which it appertains to make and use the same.

The objects of the invention are to provide means for quickly attaching a demountable tire rim to the felly rim of an automobile wheel, and the invention has particular reference to the construction and arrangement of clamping means for securing the demountable rim in place after it has been sleeved over the felly rim. These clamping devices are used in connection with transversely inclined engaging surfaces upon the demountable and felly rims, and a wedge ring, and have the advantages that they are rotatable to remove their clamping edges from contact with said ring, will stay in any position in which they are placed when the wheel is revolved, and cannot be removed from the felly rim or lost. Also, stops are placed to prevent a complete rotation of the clamps, and are set to place the clamps where they will not interfere with the removal of the demountable rim. They are also supplied with means for equalizing the pressure upon their engaging edges, by determining their exact positions relative to the wedge ring, all being capable of being set exactly alike. To accomplish these objects and to obtain the above mentioned results the device is constructed and arranged as hereinafter more fully described, shown in the accompanying drawings, and specifically pointed out in the claims.

In the accompanying drawings Figure 1 is a transverse section of a felly rim and demountable rim thereon, showing one of the clamps and the wedge ring which is shown to be reversible in character; Fig. 2 is a front elevation of one of the rim retaining clamps; Fig. 3 is a rear view thereof; Fig. 4 is a perspective view of a split spring ring inclosed in the clamp; Fig. 5 is a perspective view of a washer having an inwardly curved edge which assists in retaining the clamp and clamping nut together; Fig 6 is a side elevation of a portion on an automobile wheel showing two rim retaining clamps in position.

In these views A is the wheel felly, B is the felly rim which is provided with an inwardly turned flange C, and with circumferential inclines D and E spaced apart upon the outer and inner edges, respectively.

F is the demountable rim provided with the circumferential incline G upon its inner side at the inner edge corresponding to the incline E upon the felly rim, and also having the reverse incline H opposite the incline D upon the outer edge of the felly rim.

The inclines E and G directly engage with each other and a double wedge ring I engages the inclines D and H, the ring being reversible for convenience in use.

J is a clamp or clamping dog which is provided with an extended edge or toe K adapted to engage the wedge ring I and is rotatably secured to the inwardly turned flange C of the felly rim by means of a bolt L which passes through the flange C and felly A. The clamp J is provided with a recess M within which a nut N having a marginal flange O is inserted and the nut is screwed upon the outer end of the bolt L. The outer edge of the recess M is turned inwardly at P to prevent the nut from escaping and a friction washer Q having an inwardly turned edge q insures the easy movement of the nut and flange within the cavity M. The back wall of the clamp is curved at R and the inner face of the nut is correspondingly curved at r to give a ball bearing for the nut and permit the clamp to tilt slightly thereon.

A spring split washer S is secured between the flange and friction washer, which provides a sufficient and constant pressure to retain the clamp in any position in which it may be left when adjusting the tire and will remain in its assembled position without falling down when the wheel is turned around to adjust the other clamps as when loosening the demountable rim.

The clamps do not have to be removed from the felly rim but are limited in movement when turned to permit the removal of the demountable rim by means of a stop or pin T upon the felly rim and a lug V upon the clamp.

To give freedom of movement to the extremity of the clamp where it engages the wedge ring, a raised ridge or heel U is provided at the opposite edge of the clamp where it engages the downwardly extending flange C of the felly rim, and to provide means for equalizing the pressure of the several clamps, and giving uniformity to their action, a washer W of felt, leather, rubber, or similar resilient material is sleeved over the bolt between the clamp and flange C. The thickness of all these washers is the same, and the clamps will all press alike when engaging the washers, and an equal number of turns upon each nut will then insure an equal amount of pressure upon each clamp.

The wedge ring I is preferably double to increase the convenience of its use.

Having described the invention what I claim as new and desire to secure by Letters Patent is:

1. In a device for clamping a demountable rim upon a felly rim, said felly rim having a flange on its outer edge, the combination with said rims, of a wedge ring engaging therewith, a bolt in said felly rim, a clamping dog therefor, said dog having a recess, a flanged nut in said recess, a spring washer in said recess engaging said flanged nut, and a resilient washer between said clamping dog and said flange on said felly rim.

2. In a device for securing a demountable rim to a felly rim, said rims having corresponding inclines, and said felly rim having an inwardly extending flange, a wedge ring engaging both said rims, a bolt in said flange on said felly rim, a clamping dog rotatable on said bolt, and having a heel adapted to engage said flange on said felly rim, and a toe engaging said wedge ring, said clamping dog provided with an annular recess, a nut upon said bolt having a flange inclosed within said recess, said nut having a rounded inner face, and said recess provided with a corresponding concaved rear wall.

In testimony whereof, I hereunto set my hand this 6th day of July, 1913.

WILLIAM N. BOOTH.

In presence of—
F. B. KAVANAGH,
WM. M. MONROE.